United States Patent

[11] 3,591,943

| [72] | Inventor | Bertram Edward Charles Green<br>Moat House, Badwell Ash, Bury St. Edmunds, Suffolk, England |
|---|---|---|
| [21] | Appl. No. | 827,611 |
| [22] | Filed | May 26, 1969 |
| [45] | Patented | July 13, 1971 |
| [32] | Priority | May 28, 1968 |
| [33] | | Great Britain |
| [31] | | 25,545/68 |

[54] MOUNTINGS FOR PHOTOGRAPHIC TRANSPARENCIES
6 Claims, 5 Drawing Figs.

[52] U.S. Cl. ................................................. 40/158
[51] Int. Cl. ................................................. G09f 1/10
[50] Field of Search ........................................ 50/152, 158, 158 B

[56] References Cited
UNITED STATES PATENTS

| 2,291,173 | 7/1942 | Simpson | 40/158 B |
| 2,861,368 | 11/1958 | Rosenberg | 40/158 |
| 2,863,244 | 12/1958 | Lyon et al. | 40/158 |
| 2,268,529 | 12/1941 | Stiles | 40/158 B |
| 2,184,007 | 12/1939 | Staehle | 40/158 |
| 2,690,022 | 9/1954 | Sacre | 40/159 |
| 3,077,688 | 12/1963 | Friedman | 40/158 |
| 3,235,991 | 12/1966 | Harper et al. | 40/158 |

FOREIGN PATENTS

| 936,301 | 12/1955 | Germany | 40/152 |

Primary Examiner—Robert W. Michell
Assistant Examiner—Wenceslao J. Contreras
Attorney—Watson, Cole, Grindle & Watson ABSTRACT: The described invention relates to means for protectively mounting photographic transparencies and similar specimens for viewing or projection and resides basically in providing for two protective transparent sheets, on each side of the transparency itself, and spaced therefrom.

PATENTED JUL 13 1971
3,591,943
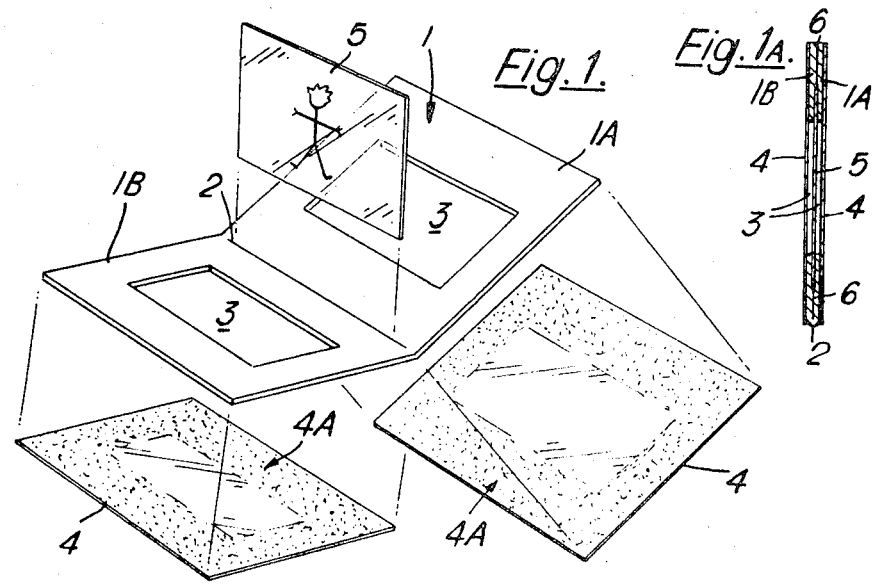
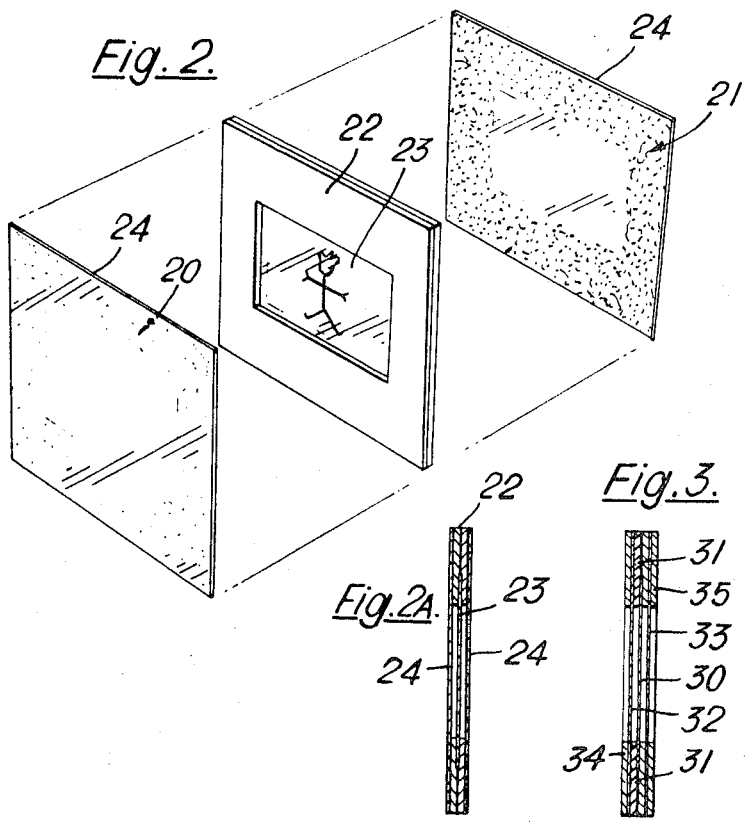
Inventor
Bertram Edward Charles Green
By
Watson, Cole, Grindle & Watson
Attorney

MOUNTINGS FOR PHOTOGRAPHIC TRANSPARENCIES

This invention relates to mountings for photographic transparencies or similar specimens which are mounted for viewing, for the purpose of their being viewed or projected and for their protection in storage both physically and against actinic deterioration. It is primarily intended to be used with transparencies which are already provided with a cardboardlike frame apertured to reveal the transparency, which assembly is known as a ready mount, but may be used if required, as the direct and only mounting of the actual photographic print, i.e. fulfilling the purpose of a ready mount with additional advantage.

According to the invention generally, a mounting for a photographic transparency is provided, including two sheets of transparent sheet window material attached by their margins by adhesive one at each side of the transparency to an enframing element of thickness substantially greater than the transparency so that each such sheet is held spaced from and in a plane parallel to the transparency.

According to a further aspect of the invention, a mounting for a photographic transparency as above stated is provided, in which two sheets of window material have the same rectangular shape and overall dimensions as the cardboard (or like) ready mount in which the transparency is directly mounted, said two sheets being attached adhesively by their margins to the margin of the ready mount.

The invention further includes a mounting comprising two sheets of originally transparent material of rectangular shape and of the dimensions of a standard ready mount, each sheet having adhesive applied to one side thereof over its margin which is to surround the transparency for the purpose of sticking each sheet to one side of the ready mount.

The invention further provides for reflective surfacing of the mounting over the area which enframes the transparency.

The invention is described, by way of examples, in relation to the accompanying drawings, in which:

FIGS. 1 and 1A illustrate a first example;
FIGS. 2 and 2A illustrate a second example; and
FIG. 3, in section, illustrates a third example.

In FIG. 1 there is shown in an exploded perspective view, and in FIG. 1A a sectional view, a rectangular blank of stiff paper or cardboard 1, which has a median line at 2 bisecting it into two equal halves which are rectangles 1A and 1B when the blank is creased and bent along the line 2. Each half has formed in it a rectangular aperture as at 3 which positionally and dimensionally corresponds to the effective shape of a photographic transparency indicated at 5. The blank 1 is of course opaque, and at least its outer surface (i.e. outer after folding) may be made heat reflective, for example by printing or other application of a metallized surface such as aluminum foil or paint. The assembled mounting further comprises two window parts 4, each of which is a rectangle of thin transparent plastics sheet corresponding in dimensions and shape to each of the halves 1A, 1B. Either or both parts 4 has its enframing margin 4A coated on one side with adhesive; and may have, beneath such adhesive, a heat-reflective coating. The transparency is indicated at 5, and it is held enframed between the halves 1A and 1B. The facing surfaces (i.e. at their interface 6) of the blank 1 are given a surface of impact adhesive, which before the mounting is used is protected by a sheet of removable parting sheet such as varnished or glossy paper. When these facing surfaces have been exposed by removing the parting sheet, the transparency 5 is laid on one half, say 1A, and the other half, 1B, is folded through 180° and pressed into contact with the first half 1A. Thus far, the blank 1 considerably resembles an ordinary ready mount. The halves 1A, 1B adhere to each other, and to the edges of the transparency 5. The two window parts are stuck to the margins of halves 1A, 1B, by their adhesively coated margins 4A. It can be seen from FIG. 1A that the transparent areas of the window parts 4 are spaced from and in planes parallel to the transparency 5.

The material of the parts 4 is, preferably, 0.008 inches to 0.005 inches thickness transparent polyester film, selected so as to be, in this case, unaffected by the heat of an ordinary projector, and also, to some extent, to act as an actinic shield to protect the transparency 5 as well as being a physical protection.

The second example is shown in FIGS. 2 and 2A, again respectively an exploded perspective and a section. This example comprises two transparent windows, 20 and 21, each adherent by its margin to a conventional cardboard ready mount 22 in which is mounted a transparency 23. The windows 20, 21 are geometrically similar to and somewhat larger dimensionally than the exposed area of the transparency 23 and they are of the same perimetric dimensions as the ready mount 22. The marginal areas 24 of the windows 20, 21 are coated with an impact adhesive, and the whole of each window sheet is protected on its adhesive-treated side by removable parting sheet (not shown). The adhesion of the two sheets 20, 21 secures them to the ready mount 22. Thus the transparency 23 and its original ready mount 22 are finally mounted and protected. It will again be noted (from Figure 2A) that there is space between the transparency 23 and the two windows 20, 21. The marginal areas 24 of the window parts are preferably coated with a heat-reflective surface prior to the application of the adhesive.

In all cases, there may be printed matter such as a direction as to "handing" for projection, applied to the sheet forming the windows.

FIG. 3 shows in section a very simple example. In this, a transparency 30 is assumed to be already in a ready mount 31. Two sheets 32 and 33 of transparent material are adherently stuck to two outer enframing elements 34, 35 respectively. The elements 34, 35 correspond in shape and dimensions to the ready mount 31. Each sheet 32, 33 is coated on both sides of its margin area with adhesive, and consequently they interattach the ready mount 31 with the elements 34, 35.

I claim:

1. A cover for one side of a film mount of the type having a central aperture through which a transparency mounted therein is viewed, comprising a planar lamina of a transparent plastics material having perimetric dimensions substantially the same as the film mount, a heat-reflective layer and an outer adhesive layer, said layers forming a central aperture corresponding in extent and location with the central aperture of the mount.

2. A cover as in claim 1 wherein said plastics material has a thickness of between 0.005 and 0.008 inches.

3. A cover as in claim 1 wherein said adhesive is of the contact type and further comprising means for covering said adhesive and having a release surface in contact with said adhesive.

4. A cover for a photographic transparency as in claim 1, further comprising an enframing element having a thickness substantially greater than the thickness of said transparency, whereby said cover is attached by said adhesive to each side of said enframing element so as to be spaced from and in a plane parallel to said transparency.

5. A cover according to claim 4, wherein said enframing element comprises a rectangular blank having one side coated with adhesive and a symmetrically located median line defining two rectangular halves of said blank, said element including a rectangular opening to register with the transparency, the two halves of said blank being adapted to be folded through 180° so as to hold between them and enframe the transparency and forming said enframing element.

6. A cover according to claim 4, further comprising a rectangular apertured frame mounted on the outside of said cover.